US006561178B1

(12) United States Patent
Hayes

(10) Patent No.: US 6,561,178 B1
(45) Date of Patent: May 13, 2003

(54) UMBRELLA ASSEMBLY FOR OUTDOOR BARBEQUE GRILL

(76) Inventor: Roger M. Hayes, 2124 Peninsula Rd., Oconomowoc, WI (US) 53066

( * ) Notice: Subject to any disclaimer, the term of this patent is extended or adjusted under 35 U.S.C. 154(b) by 0 days.

(21) Appl. No.: 10/004,244

(22) Filed: Nov. 2, 2001

(51) Int. Cl.$^7$ .............................. A47J 37/00; A45B 3/00
(52) U.S. Cl. ....................... 126/25 R; 126/9 R; 135/16
(58) Field of Search ............................... 126/25 R, 9 R, 126/41 R, 245, 38; 135/15.1, 16, 17; 93/5; 248/515

(56) References Cited

U.S. PATENT DOCUMENTS

| | | | |
|---|---|---|---|
| 4,170,173 A | 10/1979 | Bradford | 99/341 |
| 4,711,422 A * | 12/1987 | Ibanez | 248/230.5 |
| 4,848,385 A * | 7/1989 | Pennella | 135/16 |
| 5,115,827 A * | 5/1992 | Lee | 135/33.7 |
| 5,431,364 A * | 7/1995 | Etter | 135/16 |
| 5,433,233 A * | 7/1995 | Shiran et al. | 135/20.1 |
| 5,564,452 A | 10/1996 | Kitchen | 135/96 |
| D383,235 S | 9/1997 | Murch, Sr. | D26/60 |
| 5,937,881 A * | 8/1999 | Villa | 135/135 |
| 6,082,694 A * | 7/2000 | Joyce | 135/16 |
| 6,095,171 A * | 8/2000 | Lin et al. | 135/25.32 |
| 6,196,114 B1 | 3/2001 | Rohloff | 99/337 |
| 6,237,616 B1 * | 5/2001 | You | 135/33.5 |
| 6,250,319 B1 * | 6/2001 | You | 135/33.2 |
| 6,318,391 B1 * | 11/2001 | You | 135/27 |
| 6,330,886 B1 * | 12/2001 | Culver | 135/15.1 |
| 6,341,873 B1 * | 1/2002 | Yang | 135/16 |
| 6,357,710 B1 * | 3/2002 | Fielden et al. | 248/231.51 |

FOREIGN PATENT DOCUMENTS

| | | | | |
|---|---|---|---|---|
| CH | 636006 A | * | 5/1983 | A65B/23/00 |
| FR | 2678977 A1 | * | 1/1993 | E04H/15/58 |

OTHER PUBLICATIONS

CG Products Web Page, www.cgproducts.com, 4 pages.

* cited by examiner

Primary Examiner—Henry Bennett
Assistant Examiner—Kathryn Ferko
(74) Attorney, Agent, or Firm—Philip G. Meyers

(57) ABSTRACT

An umbrella assembly according to the invention is suitable for mounting over an outdoor barbeque grill, such as a gas or charcoal grill. The assembly includes an umbrella, an arm configured for supporting the umbrella in a position over the grill, suitable means for mounting the umbrella on the arm, suitable means for removably attaching a proximal end of the arm to the grill, and suitable means for preventing the umbrella from causing a grill to which the umbrella assembly is attached from falling over when a gust of wind strikes the umbrella. The means for mounting the umbrella on the arm may comprise a holder which receives an end portion of a vertically oriented handle of the umbrella. The arm is preferably directed outwardly from the grill and then reaches over it, leaving space for removal of a grill cover. The means for preventing the umbrella from causing the grill to tip over during a wind gust could include wind proofing features on the umbrella as well as a break-away connection permitting the umbrella to blow away without taking the grill with it.

8 Claims, 3 Drawing Sheets

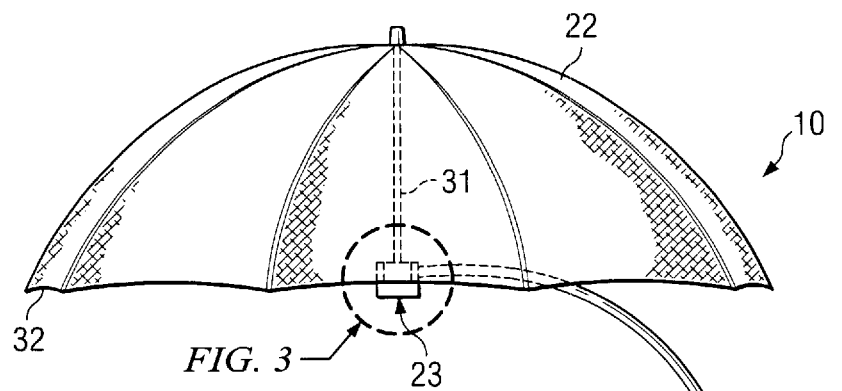
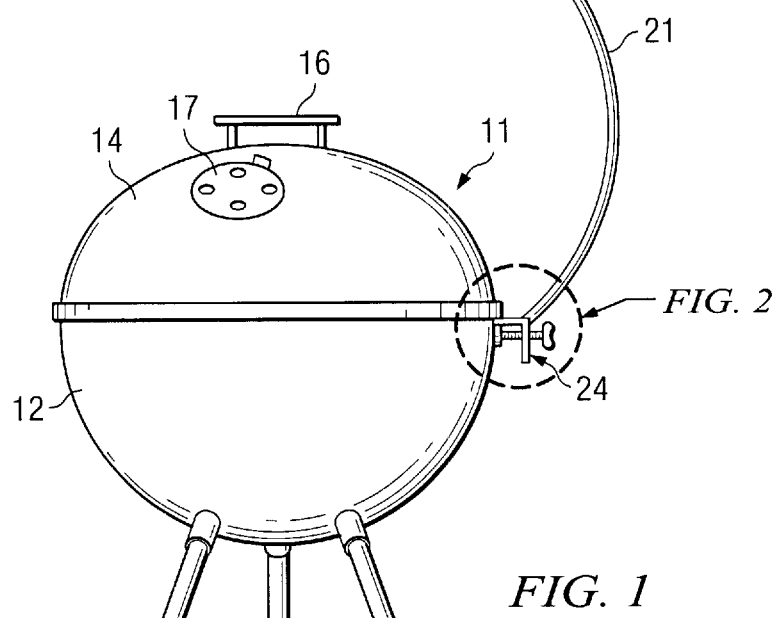
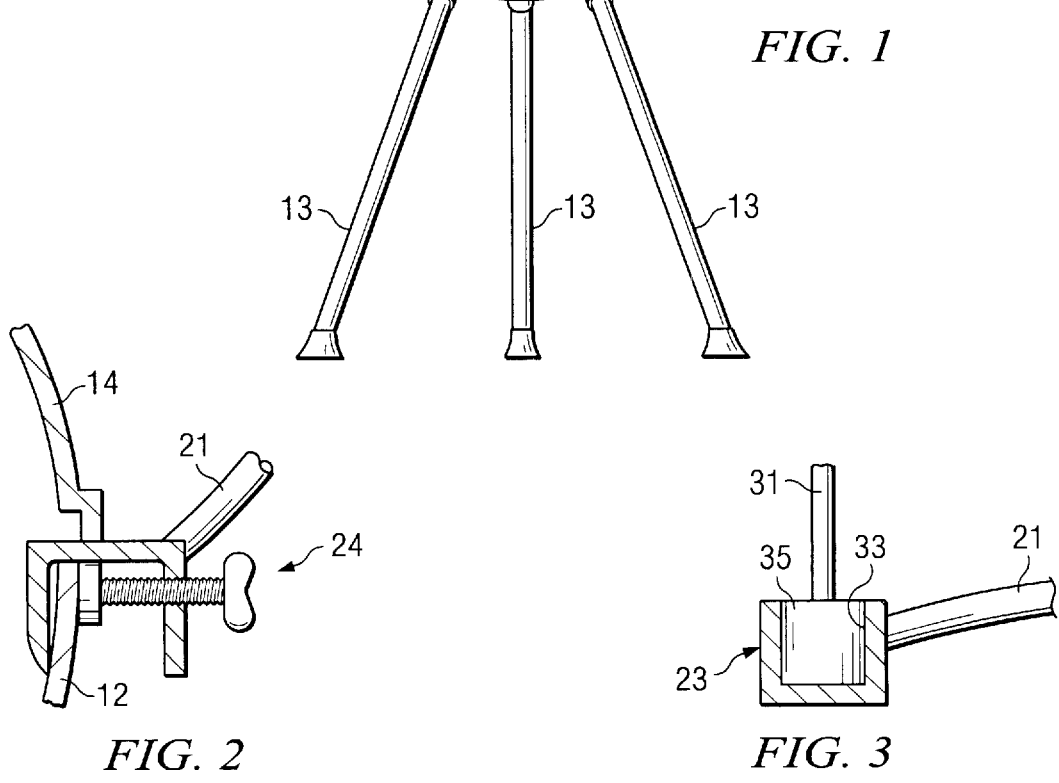
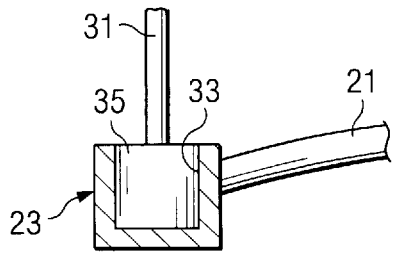

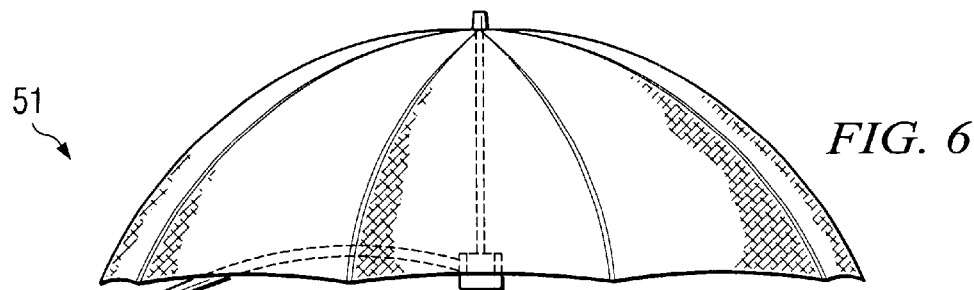
*FIG. 6*
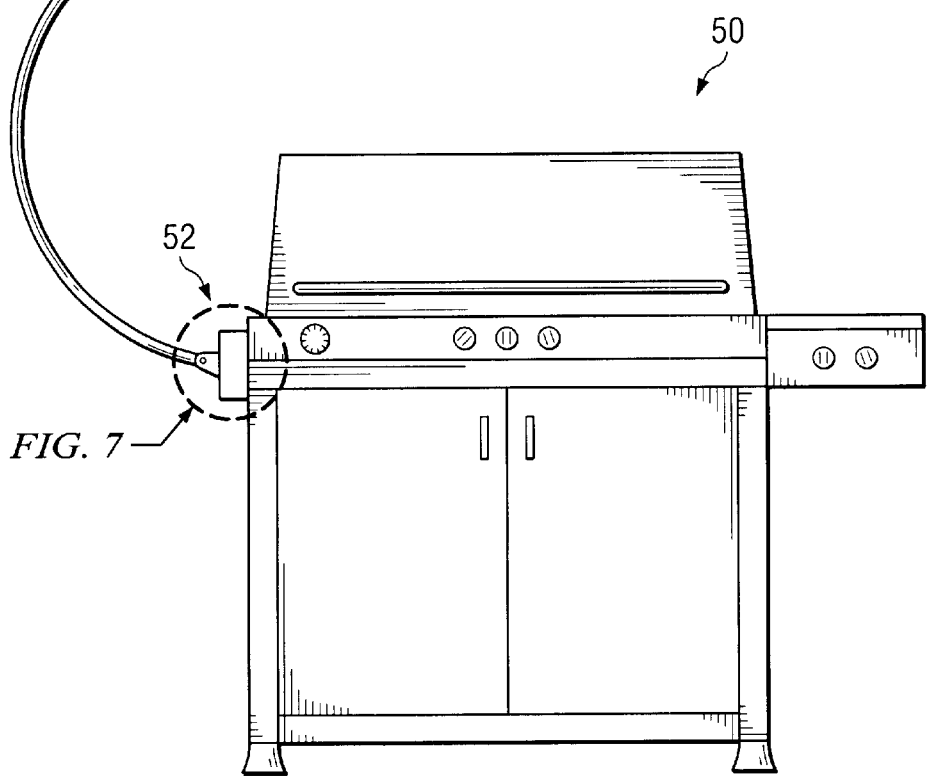
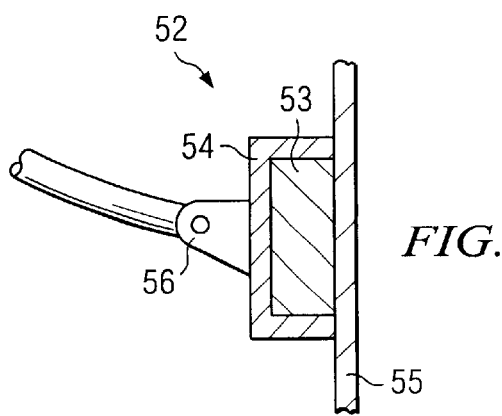
*FIG. 7*

UMBRELLA ASSEMBLY FOR OUTDOOR BARBEQUE GRILL

TECHNICAL FIELD

The present invention relates to umbrellas and canopies for structures, more particularly to an umbrella assembly for a barbeque grill.

BACKGROUND OF THE INVENTION

Outdoor barbeque grills are in common use, and a variety of accessories for such grills are known, such as an attachable light to aid in outdoor grilling at night as described in Murch, Sr. U.S. Pat. No. D383,235. A few patents have mentioned the possibility of providing an outdoor cooking grill with an umbrella or canopy for protecting the grill and the cook from rain. See, for example, U.S. Pat. Nos. 6,196,114, 5,564,452, and 4,170,173. However, such rain coverings have not found widespread application on smaller, portable grills of the kind used by consumers. Attaching an umbrella to a grill weighing less than 50 pounds entails the risk that the umbrella will be caught by the wind and cause the entire grill to tip over, possibly resulting in fire or injury. The present invention addresses this shortcoming.

SUMMARY OF THE INVENTION

An umbrella assembly according to the invention is suitable for mounting over an outdoor barbeque grill, such as a gas or charcoal grill. The assembly includes an umbrella, an arm configured for supporting the umbrella in a position over the grill, suitable means for mounting the umbrella on the arm, suitable means for removably attaching a proximal end of the arm to the grill, and suitable means for preventing the umbrella from causing a grill to which the umbrella assembly is attached from falling over when a gust of wind strikes the umbrella. The means for mounting the umbrella on the arm may comprise a holder which receives an end portion of a vertically oriented handle of the umbrella. The arm is preferably directed outwardly from the grill and then reaches over it, leaving space for removal of a grill cover. The means for preventing the umbrella from causing the grill to fall over may take a variety of forms and for that reason is generally defined. However, such means is part of the umbrella assembly, not the grill itself, and thus would not encompass simply making the grill so massive it cannot tip over, or permanently mounting the grill to its supporting surface.

According to one embodiment of the invention, the preventing means covers structures affecting the wind resistance of the umbrella itself; the problem of tipping over a portable grill can be solved by wind-proofing the umbrella. For example, the umbrella is provided with means such as venting that reduces forces exerted by wind on the umbrella. As a second approach, the umbrella assembly can also be provided with means for permitting the umbrella to separate from the arm when a wind force exerted on the umbrella exceeds a predetermined level. This prevents the grill from tipping over by preventing the umbrella from taking the grill with it if a strong gust of wind occurs.

In another aspect, the invention provides a connection between the support arm from above the umbrella, rather than from below. Such an umbrella assembly suitable for mounting over an outdoor barbeque grill includes an umbrella, an arm configured for supporting the umbrella in a position over the grill, means for mounting the umbrella on the arm, which means includes a mechanical connection between a top end of a central shaft of the umbrella and an end portion of the arm extending above the umbrella, and means for removably attaching a proximal end of the arm to the grill. These and other aspects of the invention are discussed in the detailed description which follows.

BRIEF DESCRIPTION OF THE DRAWINGS

A more complete understanding of the invention may be had by reference to the following detailed description when taken in conjunction with the accompanying drawings, wherein:

FIG. 1 is a front view of an umbrella structure according to the invention mounted on a round grill;

FIG. 2 is a sectional detail view of the side mounting assembly shown in FIG. 1;

FIG. 3 is a sectional detail view of the umbrella holder assembly shown in FIG. 1;

FIG. 6 is a front view of a further umbrella structure according to the invention mounted on a rectangular gas grill; and FIG. 7 is a sectional detail view of the side mounting assembly shown in FIG. 6.

DETAILED DESCRIPTION

Figure 4:
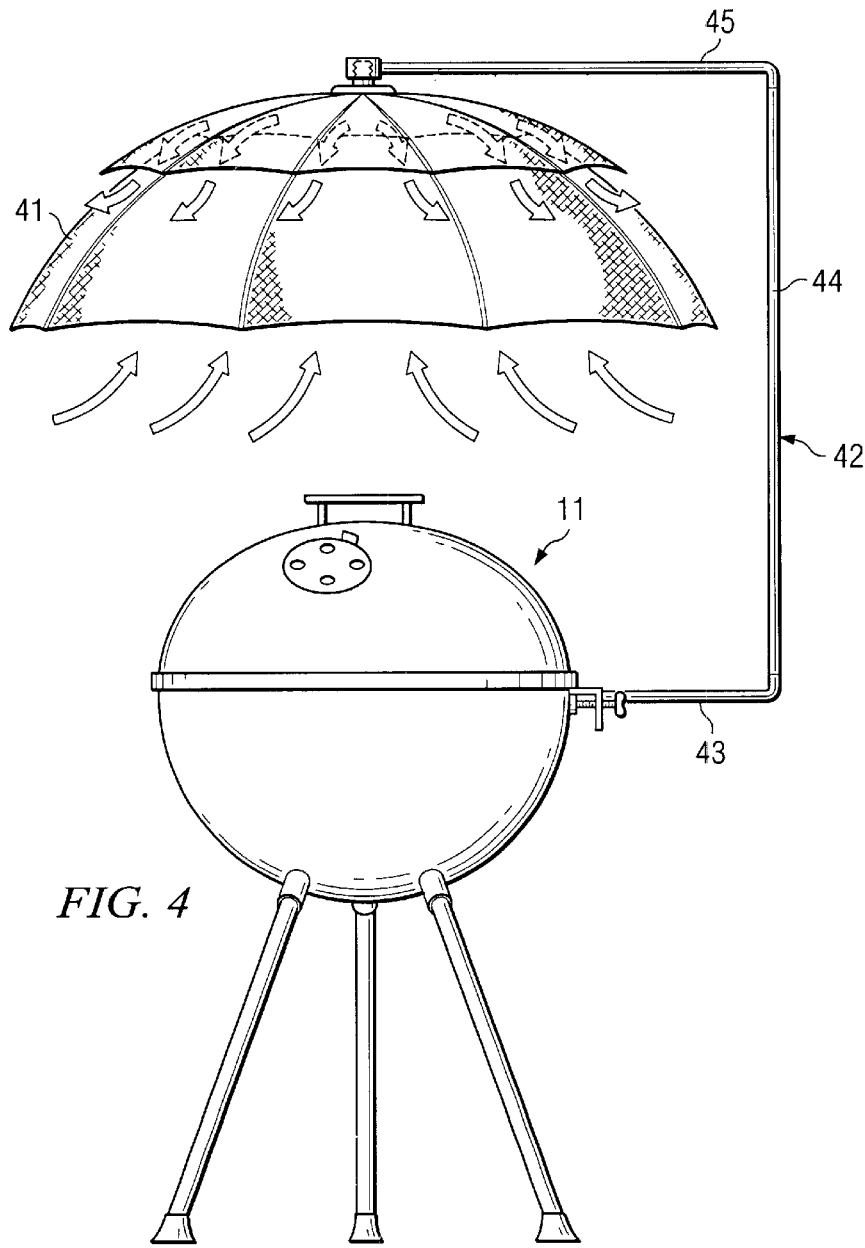
FIG. 4 is a front view of a further umbrella structure according to the invention using a wind resistant umbrella.

While the invention will be described with reference to the illustrated embodiments, it is not intended to limit the invention but, on the contrary, it is intended to cover such alternatives, modifications and equivalents as may be included in the spirit and scope of the invention.

A large number of outdoor grills are already in use worldwide and the umbrella attachment of the present invention would only be needed under certain weather conditions, e.g., rain, intense sun (to provide shade) or snow. As such, an umbrella assembly 10 as shown in FIG. 1 is preferably of the type that can be removed from a portable charcoal grill 11 when not in use, Grill 11 is of typical design, including a hemispherical lower shell 12 that houses a lower grill for retaining coals and an upper grill for cooking supported by a tripod of legs 13. The traditional hemispherical cover 14 includes a handle 16 and adjustable vent 17.

According to one aspect of the invention, umbrella assembly 10 includes an outwardly curved or bowed support arm 21 and an umbrella 22 mounted to a holder 23 at the distal end of arm 21. A support fixture 24 at the proximal end of arm 21 attaches directly to the grill 11 for removably mounting umbrella assembly 10 thereto with umbrella 22 preferably centered over grill 11 as shown. Arm 21 preferably curves outwardly, and optionally upwardly, so that it does not obstruct access to the grill surface or hinder removal and replacement of cover 14. For this purpose, arm 21 may be made of metal or fiberglass and should be relatively rigid so that umbrella 22 does not move excessively while the grill 11 is in use, but it may be useful to form arm 21 from a deformable, poseable material so that the user can adjust the position of umbrella 22 by bending arm 21. In the alternative, arm 21 could be made using two or more curved telescoping segments that would permit the user to shorten or lengthen arm 21 over a limited range as needed. Obviously, the entire assembly 10 must be sufficiently lightweight not to overbalance the relatively small charcoal grill 11.

Mounting fixture 24 may take a variety of forms. For example, such a fixture 24 may comprise an adjustable clamp like that shown in D383,235, the contents of which are incorporated by reference herein, which is set onto the outer rim of lower shell 12. A spring-loaded clamping device with a pair of jaws for engaging the rim of shell 12, or an external handle or other projection, could also serve the purpose. If grill 11 was manufactured with special holes for mounting assembly 10, then the mounting fixture could be a base plate that attaches directly to the side of 12 by fasteners such as screws or nuts and bolts. Similarly, if a threaded projection is provided on the outside of shell 12, then fixture 24 may comprise a threaded socket, or the reverse arrangement may be employed. Mounting fixture 24 should in any case be both heat and weather-resistant.

In this embodiment, umbrella 22 is much like a conventional rain umbrella but with a shorter handle 31 that reaches only down to the same level as the rim 32 of umbrella 22, and not much further below, to avoid obstructing removal of the grill cover. However, as noted above, for a lightweight grill 11 such as the one shown, umbrella assembly 10 should not be capable of tipping the grill over in the event of a strong gust of wind. According to one aspect of the invention, this can be dealt with by permitting umbrella 22 to break away from its holder 23 if the wind or something else catches it. Accordingly, holder 23 preferably holds the base of handle 31 with a certain degree of force but releases it when the pulling force on the holder exceeds a certain level. This can be accomplished in several ways.

For example, as shown, handle 31 ends in a base 35 that is received in a recess 33 in a cup-shaped holder 23. Base 35 may made of plastic and friction-fit into recess 33, but with limited tightness such that base 35 comes loose if umbrella 22 is hit by a strong gust of wind, permitting the umbrella to fly away without taking the rest of the grill with it. Base 35 may in the alternative be weighted so that it remains in place until the lift on umbrella 22 is sufficiently strong to lift it out of engagement with recess 33. A releasable fastener such as Velcro (hook and pile) could be provided between the end of base 35 and the bottom of recess 33 for a similar purpose.

As a further safety measure, umbrella 22 may be provided with windproofing features. A number of patents describe umbrellas designed to resist wind by means of vents or openings in the umbrella, or by providing the umbrella in several segments so that wind currents can pass through. See, for example, U.S. Pat. Nos. 6,250,319 and 6,237,616. In the '616 patent, a vented umbrella is resistant to inversion from the wind and effective in ventilation. The umbrella comprises a foldable frame, a lower canopy, and an upper canopy in a concentric covering relation with respect to lower canopy with a small overlapped peripheral area therebetween. A plurality of nonelastic ropes are provided each connected between the center portion of peripheral edge in each sector of lower canopy and the upper ring. As such, a plurality of openings are formed at the junction between sectors of upper canopy and lower canopy in a fully extended condition. Such a double umbrella, when used in the context of the present invention, would be more resistant to wind and in addition provide venting for smoke from the grill to pass through, in the event that smoke accumulates beneath the umbrella 22. A windproof or wind-resistant umbrella when used in the context of the present invention also helps avoid the inconvenience of losing the umbrella while cooking because the umbrella has broken away from the holder. See, for example, one or more of U.S. Pat. Nos. 6,250,319, 6,237,616, 6,206,017, 6,202,661, 6,186,157, 6,173,724, 6,095,171, 6,089,244, 6,039,063, 6,024,109, 6,006,770, 5,975,099, 5,890,506, 5,842,493, 5,597,004, 5,487,401, 5,435,331, 5,368,055, 5,115,827, 5,065,779, 5,026,219, 4,979,534, 4,865,063, 4,850,564, 4,804,008, and 4,621,653, the contents of each of which are incorporated by reference herein.

Figure 5:
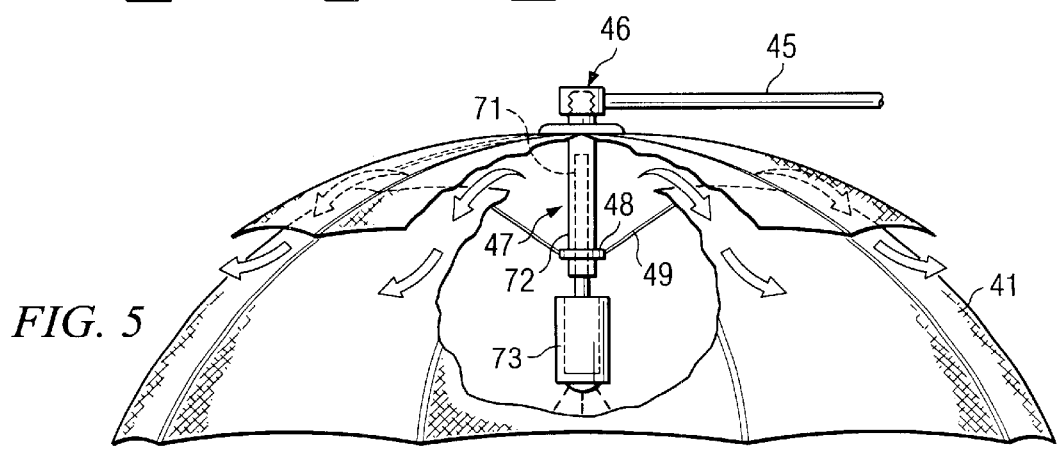
FIG. 5 is an enlarged partial view, partly broken away, of the umbrella structure of FIG. 4.

FIGS. 4 and 5 show an alternative embodiment of the invention wherein a windproof umbrella 41 as described in U.S. Pat. Nos. 6,237,616, the entire contents of which are incorporated by reference herein, is mounted over grill 11 using a C-shaped arm 42 that mounts from above at the center of umbrella 41, rather than from below. Arm 42 may be made from three aluminum or plastic pole sections 43–45 which can be disassembled when not in use. The connection 46 between a central shaft 47 of umbrella 41 may be a threaded connection as shown or any suitable mechanical connection, such as a pin-and-groove connection.

Collapsible handles for personal umbrellas are widely known in the art. Normally the point of having a collapsible handle is to extend the handle when the umbrella is in use. According to a further aspect of the invention as shown in FIG. 5, exactly the opposite arrangement is used. In the present invention, a downwardly depending axial shaft or handle for the umbrella only gets in the way. However, something similar to a handle structure is useful so that a conventional umbrella collapsing system may be used, which requires a slidable ring-shaped runner 48 connected to the umbrella ribs by stretchers 49. In its upper position, runner 48 opens the umbrella; to collapse the umbrella, the user slides runner 48 down about handle or shaft 47. Telescoping sections 71, 72 of central shaft 47 are folded up into one another while the umbrella is extended so that there is as much clearance between the umbrella and the grill as possible, and extended only as needed to slide ring 48 down to close the umbrella. An umbrella assembly according to the invention may also be provided with a cooking light, for example, a battery powered light 73 built into the end of shaft 47 which is positioned directly over the grill in ideal position to illuminate the food and using the inside of the umbrella as a lampshade. Depending on where the light would be located, it could connect to an AC outlet by a cord, or be battery powered.

FIGS. 6 and 7 show a further alternative embodiment where a gas (propane) grill 50 (gas tank not shown) has been provided with an umbrella assembly 51. This embodiment is the same as described in connection with FIG. 1, except that the attachment fixture 52 comprises a large magnet 53 inside a weatherproof, heat-resistant external housing 54. Fixture 52 self-attaches to an iron or steel sidewall 55 of grill 50 as shown and may include a spring-loaded hinge 56 that permits the user to swivel the arm and umbrella towards and away from the grill.

While certain embodiments of the invention have been illustrated for the purposes of this disclosure, numerous changes in the method and apparatus of the invention presented herein may be made by those skilled in the art, such changes being embodied within the scope and spirit of the present invention as defined in the appended claims.

What is claimed is:

1. An umbrella assembly suitable for mounting over an outdoor barbeque grill, comprising:

an umbrella;

an arm configured for supporting the umbrella in a position over the grill, the arm having distal and proximal ends;

means for mounting the umbrella to the distal end of the arm including breakaway means for preventing the umbrella from causing a grill to which the umbrella assembly is attached from falling over when a gust of wind strikes the umbrella exerting a force on the umbrella exceeding a predetermined level; and means for removably attaching the proximal end of the arm to the grill.

2. The umbrella assembly of claim 1, wherein the breakaway means comprises a cup shaped holder with a recess which receives an end portion of a vertically oriented handle of the umbrella.

3. The umbrella assembly of claim 2, wherein the arm is directed outwardly from the grill and then reaches over it, leaving space for removal of a grill cover.

4. The umbrella assembly of claim 3, further comprising means for reducing forces exerted by wind on the umbrella.

5. The umbrella assembly of claim 4, wherein the means that reduces forces exerted by wind on the umbrella comprises a vent in the umbrella.

6. The umbrella assembly of claim 1, further comprising a light attached to the umbrella for illuminating an area beneath the umbrella.

7. An umbrella assembly suitable for mounting over an outdoor barbeque grill, comprising:

an umbrella including means for opening and closing the umbrella;

an arm configured for supporting the umbrella in a position over the grill;

means for mounting the umbrella on the arm) which means includes a connection between a top end of a central shaft of the umbrella and an end portion of the arm extending above the umbrella, the central shaft comprising telescoping sections for adjusting the position of the umbrella relive to the grill, the telescoping sections extendable when the umbrella is open to maximize the distance between the umbrella and the grill and retractable to close the umbrella;

breakaway means for preventing the umbrella from causing a grill to which the umbrella assembly is attached from falling over when a gust of wind strikes the umbrella exerting a force on the umbrella exceeding a predetermined level; and means for removably attaching a proximal end of the arm to the grill.

8. The umbrella assembly of claim 1, further comprising a light attached to a bottom end of the central shaft of the umbrella for illuminating an area beneath the umbrella.

* * * * *